United States Patent Office 3,378,494
Patented Apr. 16, 1968

3,378,494
WATER-IN-OIL EMULSION FLUIDS
Jerry E. Berger, Edwardsville, Ill., assignor to Shell Oil Company, New York, N.Y., a corporation of Delaware
No Drawing. Continuation-in-part of application Ser. No. 388,261, Aug. 7, 1964. This application Oct. 1, 1965, Ser. No. 492,335
10 Claims. (Cl. 252—77)

ABSTRACT OF THE DISCLOSURE

Water-in-oil emulsions comprising a combination of two additives, one of which is a succinic anhydride or imide derivative thereof and the other a polyalkoxylated partial ester, possess good emulsion stability over a wide range of temperatures.

---

This invention is a continuation-in-part of our copending patent application Ser. No. 388,261, filed Aug. 7, 1964.

This invention relates to improved water-in-oil emulsions. More particularly, this invention relates to water-in-oil emulsions which are stable over a wide temperature range.

The type of fluid which constitutes an emulsion of water in a mineral oil has important advantages such as fire resistance, and is having increasing use in various industrial and other applications. Problems frequently arise, however, with respect to insufficient stability of the emulsion, particularly at extremes of temperature to which the emulsion may be subjected.

The present invention provides a fluid comprising an emulsion of water and mineral oil, which emulsion is remarkably stable even at extremes of temperature and from which separation does not occur even under the quite severe conditions, to which hydraulic fluids are subjected. This result is obtained by employing a combination of two additives, one of which is an alkenyl succinic anhydride or imide derivative thereof and the other is a polyalkoxylated partial ester of a polyhydric alcohol. It has been found that this additive combination provides water-in-oil emulsions which are highly stable under a wide range of temperature conditions.

The water-in-oil emulsion of the present invention is from about 20% to about 45% water phase and from about 55% to about 80% oil phase, the oil phase being essentially a mineral oil having from about 1% to about 10% by weight and preferably about 2% to about 8% of a combination of (A) an oil-soluble compound having the formula:

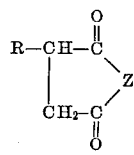

where R is a polyalkene of from about 30 to 500 carbon atoms and Z is selected from the group consisting of oxygen, N—H and N—X, X being a mono- to poly-Q-hydrocarbyl wherein Q is an atom having an atomic number of 7–8 and replaces a carbon atom in an otherwise hydrocarbyl radical and (B) a polyalkoxylated partial ester of a polyhydric alcohol with monocarboxylic acid, the ratio of (A) to (B) being in the range from about 1:1 to 8:1.

Mineral oils suitable for the oil base include distillate oils such as gasoline, kerosene, furnace oils, lubricating oils and the like. Residual oils are preferably subjected to a suitable treatment to remove asphaltenes or other undesirable constituents. For hydraulic fluids, lubricating oils are highly desired for the base oil and these include those having a high viscosity index, i.e., a viscosity index (Dean-Davis) of at least 80, preferably between 90 and 100. Mineral oil fractions of this type are derived from paraffinic, naphthenic or mixed base crudes. They should also be in the lubricating oil range and have a viscosity, as determined at 100° F., of from about 75 to 250 SUS, preferably between 100 and 150. A typical mineral oil base of this kind is a high viscosity index refined mineral lubricating oil having the following properties:

| | |
|---|---|
| Gr., API°, 60° | 32.2 |
| Color, ASTM | 1 |
| Pour point, ° F. | 5 |
| Flash, ° F., COC | 370 |
| Fire, ° F. | 435 |
| Viscosity, SUS at 100° F. | 103 |
| Viscosity index | 93 |
| Neutralization No. | 0.01 |

In some emulsions, other lubricating oils, e.g., low viscosity index oils (20–45 VI) may be used. These low viscosity index oils have a viscosity in the range from about 40 to 200 SUS at 100° F.

The oil-soluble compound which is additive (A) is an alkenyl succinic anhydride or its imide derivative. The alkenyl succinic anhydride can be prepared by alkylating maleic anhydride with a polyalkene. The polyalkene (R) used to alkylate maleic anhydride functions as an oil-solubilizing aid and may be prepared by any known means provided it contains the desired number of carbon atoms. Examples of such polymers include polyethylene, polypropylene, polybutene, polyisobutylene, copolymer of ethylene/propylene, copolymer of ethylene/isobutylene, copolymer of ethylene/alpha-methyl styrene and the like. Monoalkylation of maleic anhydride with the above type olefinic polymers can be carried out by conventional means known in the art, preferably in the absence of a catalyst and at a temperature ranging from about 300° F. to 600° F., preferably between 350° F. and 450° F. The mole ratio of the polyalkene to maleic anhydride may vary from 1:1 to 1:10, preferably from 1:1 to 1:5, respectively. Particularly useful in the monoalkylation of maleic anhydride are polyisobutylenes in the molecular weight range of 300 to 5,000, preferably from 800 to 1500.

The imide derivatives are prepared by reacting in a known manner alkenyl succinic anhydride with an amine. Examples of amines which can be reacted with alkenyl succinic anhydride include monoamines such as ammonia and aminoalkanols or polyamines such as monoalkylene diamines and polyalkylenepolyamines. Primary amines are preferred over the secondary amines. The latter may not form a true imide but are to be included within the scope of this invention.

The N-substituted alkenyl succinimides include those of the azahydrocarbyl and oxahydrocarbyl type which can be prepared by reacting primary amines with alkenyl succinic anhydride. In general, the radicals attached to the nitrogen atom of the imide have from about 1–10 carbon atoms and from about 1–5 oxygen or nitrogen atoms and are aliphatic in nature. Terminal-azahydrocarbyl and terminal-oxahydrocarbyl types are preferred.

As examples of azahydrocarbyl type derivatives, one group is prepared from a monoalkylene diamine such as ethylene diamine, propylene diamine, butylene diamine, octylene diamine, and the like. Another group is prepared from dialkylaminoalkylene amines having a total of about 3 to 10 carbon atoms as exemplified by dimethylaminomethylamine, dimethylaminopropylamine, diethylaminopropylamine, diethylaminobutylamine, dipropylaminobutylamine and the like. In general, it is preferred that the alkyl groups be methyl groups such as dimethylaminopropylamine. Still another group is prepared from polyalkylene polyamines such as diethylene triamine, dipropylene triamine, tetraethylene pentamine, pentaethylene hexamine. These various imides and their preparation are described in, for example, U.S. Patents 3,018,291 and 3,131,150.

Exemplary of the oxahydrocarbyl type derivatives are those prepared from aminoalkanols. Examples of suitable aminoalkanols are the amino-$C_{1-4}$ alkanols such as the primary amines 1-amino-2-hydroxyethane, 1-amino-2-hydroxypropane, 1-amino-3-hydroxypropane, 1-amino-2,-dihydroxypropane, and their higher homologues and the primary amines with a branched chain, such as bis(hydroxymethyl)aminoethane and tris(hydroxymethyl)aminomethane. Examples of secondary amines which form reaction products with the alkenyl succinic anhydride are ethyl-2-hydroxyethylamine, propyl - 2 - hydroxypropylamine, propyl-3-hydroxypropylamine, diethanolamine, diisopropanolamine and their homologues, and alkyl(polyhydroxyalkyl)amines.

Preferred imides are obtained from $C_{30-500}$ alkenyl-substituted succinic anhydride and amino-alkanepolyol and particularly an amine having at least three hydroxyl groups. In particular, preference is given to the reaction products of primary amines having at least three hydroxyl groups, for instance, tris(hydroxymethyl)aminomethane.

The reaction between the polyalkene succinic anhydride and the aminoalkanol can be carried out with or without the presence of a catalyst at temperatures ranging between 50° and 300° C. When no catalyst is used higher reaction temperatures (150–250° C.) are required whereas when a catalyst such as pyridine is used the reaction temperature is much lower, namely between 60 and 100° C.

The ratio of the reactants may vary within wide limits such as 1–10 moles of the anhydride to 0.25 to 20 moles of the aminoalkanol, a preferred ratio being 1 to 2 moles of the anhydride to 0.5 to 10 moles of the aminoalkanol.

The reaction can be carried out in a low-boiling solvent such as hexane, heptane, octane, isooctane or the like and on completion of the reaction the product is filtered to remove any insoluble contaminants and then stripped with steam to remove the solvent. With low boiling solvents, the reaction is conducted under pressure to avoid vaporization of the solvent.

To prepare polyoxahydrocarbyl derivatives, the reaction product of alkenyl succinic anhydride and aminoalkanol may be alkoxylated. For example, an alkylene oxide such as ethylene oxide, propylene oxide -1,2, etc. is reacted with hydroxyl structure in an N-hydroxyalkyl alkenyl succinimide such as, for example, N-hydroxypropane $C_{30-500}$ alkenyl succinic anhydride. Such alkoxylated succinimides are considered to be novel compounds.

If desired, a little oil may be added to the reaction product, by which means a concentrate is obtained that can be used for the preparation of emulsions. Such oil may, if so desired, be admixed to the reactants before the reaction.

The second essential additive is a polyalkoxylated partial ester of a polyhydric alcohol. These esters are known in the art. In general, the ester has, prior to alkylation, two to five free hydroxyl groups per molecule and is prepared from polyols having a relatively low number of carbon atoms, i.e. about 6 carbon atoms or less. Particularly suitable polyhydric alcohols are the inner ether alcohols prepared by partially dehydrating hexahydric alcohols such as mannito, sorbitol or dulcitol to inner ether polyhydric compounds having 1 or 2 ether groups in the molecule in the manner described in U.S. Patent 2,322,820. Compounds of this type are exemplified by sorbitan, mannitan, dulcitan, etc.

Any suitable organic monocarboxylic acid can be employed in the preparation of the ester additive. Preferred acids are the naturally occurring fatty acids, preferably those having 12 to 30 carbon atoms per molecule e.g. lauric, myristic, palmitic, oleic, stearic, and the like. Particularly preferred are the fatty acids having from about 16 to 22 carbon atoms per molecule. The fatty acid is generally reacted with the polyhydric alcohol in an amount to provide the monoester. Monesters of this type include sorbitan monolaurate, sorbitan monosterate, sorbitan, monooleate, sorbitan monoricinoleate, mannitan, monolaurate, mannitan monooleate, and mixtures thereof.

The alkoxylation can be performed in any suitable known manner such as by contacting the partial ester with an alkylene oxide, e.g. ethylene oxide, propylene oxide-1,2, etc. to react the alkylene oxide with hydroxyl structure in the partial ester. Preferably the number of moles of alkylene oxide reacted per mole of partial ester is within the approximate range of from 4 to 24 in order to impart a desired hydrophilic character to the ester. The formation of relatively hydrophilic compounds by alkoxylation of partial esters of polyhydric alcohols is described in U.S. 2,380,166. Polyoxyalkylated esters are available comercially as "Tweens" from the Atlas Chemical Industries, Inc.

It is essential that both additives as described above be employed in the hydraulic fluids of the present invention. Otherwise separation of the emulsion to provide excessive amounts of oil is obtained after a relatively short period of time or an oil-in-water emulsion is obtained. The ratio of aditives in the composition is preferably within the range from 1 to 8 and preferably from 2 to 4 parts per weight of alkenyl succinic anhydride or imide derivative per part of polyalkoxylated ester.

Excellent emulsion stability, especially under freeze-thaw conditions is obtained by the further addition of a water soluble alkylene glycol such as the lower alkylene glycols, i.e. $C_2-C_6$ alkylene glycols, and particularly ethylene glycol. The alkyene glycol can be use in amounts of up to 25%, preferably from about 1 to 20% by weight based on the aqueous phase. Particularly preferred concentrations of alkylene glycol are in the range of about 5 to 15% by weight based on the aqueous phase.

In addition to the above additives it is preferred to use in the composition of the invention small amounts of from about 0.01% to about 2%, preferably from about 0.2% to about 1%, optional additives such as antioxidants, anti-corrosion agents, anti-wear agents, pour point depressants and the like to improve other characteristics of the emulsion. The antioxidants include the phenolic amines and/or metal thiophosphate compounds. The phenolic compounds are illustrated by the alkyl phenols, e.g., di- and trialkyl phenols, for instance, 2,4-, 2,3-, 3,4-, 2,6-, and 3,5-diamylphenol; 2,4-dimethyl-6-tertiarybutylphenol; 2,6-ditertiarybutyl-4-methylphenol. The amines are illustrated by arylamines such as phenyl-alpha-naphthylamine or phenyl-beta-naphthylamine. The metal thiophosphates are illustrated by alkaline earth metal thiophosphates, e.g., calcium or zinc dimethyl cyclohexyldithiophosphate. Anti-wear agents include sulfur-containing compounds such as oil-soluble polychloro hydrocarbyl thiocarbonate esters, e.g., polychloronaphtha methyl xanthate marketed by Monstanto Chemical Co. under the name "Santopoid S" and characterized by sp. gr. 1.19 at 60°/60° F., flash point 250° F., viscosity 63 cs. at 100° F., sulfur 11%, chlorine 31%. Thiocarbonates of this type are prepared by reacting a chlorinated petroleum naptha with an alkali metal (potassium) alkyl dithiocarbonate. Other anti-wear agents include, for example, organic sulfides such as dibenzyl disulfide or dichlorodibenzyl disulfide, polyvalent metal dithiophosphates such as zinc or lead salts of $C_{4-12}$ alkyl dithiophosphates, and polyvalent metal dithiocarbamates such as the zinc, cadmium or lead salts of N- or N,N'-$C_{1-8}$ alkyl substituted dithiocarbamic acid. The butyl or amyl substituted compounds are generally preferred. Suitable anti-corrosion agents, including vapor space inhibitors to protect against corrosion in vapor spaces of storage or other equipment, may be added. Vapor space inhibitors are generally effective in minor amounts, e.g., 0.2–0.3% w. and include, for example, volatile amines or $C_{7-12}$ monocarboxylic acids. Exemplary compounds are n-hexylamine, dicyclohexylamine, piperidine, morpholine, 2,6-dimethylmorpholine, diethylaminoethanol, octanoic acid, nonanoic acid, decanoic acid, and the like. Vapor space inhibitors are preferably used in compositions containing polyalkenyl succinic anhydride per se as the imide derivative is less corrosive.

Dyes and anti-foaming agent can be added to compositions of this invention. Oil-soluble dyes include naphthol yellow, Sandoz yellow, methylene blue, alizarin compounds, etc., while anti-foaming agents include silicone polymer (DC–200 fluids ranging in viscosity in centistokes from 100 to 1000 at 250° C.) of silicone type A fluid made by Dow-Corning Co. and described in U.S. Patents 2,563,588 and 2,662,055 and mixtures thereof. Suitable pour point depressants include for example, the polymeric methacrylates marketed by Rohm and Haas Co. under the name Acryloid 150.

Because polybutenyl succinic anhydride is a relatively strong carboxylic acid, corrosion of certain metals may be above that which is considered tolerable. In such an event, the addition of an inorganic base to the aqueous phase is advantageous. Any suitable base can be used, such as compounds of the alkali and alkaline earth metals. Because of solubility characteristics and convenience, the alkali metal compounds such as $K_2CO_3$, KOH, NaOH and the like are preferred. To avoid corrosion of certain metals, e.g., brass and copper, from basic emulsions, the amount of base should be less than 2 to 3 times the stoichiometric amount required to neutralize the polybutenyl succinic anhydride. In general, the amount of base is from about 0.05 to 2% and preferably 0.1 to 1% by weight, based on the aqueous phase. Although the base in the aqueous phase presumably reacts with the polyalkenyl succinic anhydride in the oil phase when the two phases are mixed, the final emulsion is apparently more stable than emulsions prepared from the salt synthesized separately.

A finished emulsion (Composition A) of the invention, e.g., a hydraulic fluid, can be prepared by slowly adding 40% water to 60% HVI minteral oil (100 SUS at 100° F.) containing 4% by weight, basis oil, of a combination of 3 parts by weight N-tris(hydroxymethyl)methyl polyisobutenyl succinimide [reaction product of polyisobutenyl succinic anhydride (molecular weight of polyisobutenyl chain of ca. 1100) with tris(hydroxymethyl)aminomethane] per part of polyoxyethylene sorbitan mono-oleate (Tween 80). The entire mixture is passed through a colloid mill where it is agitated until a homogeneous emulsion is formed. Other suitable means of agitation such as propeller agitation at rapid speeds can be used.

Other compositions which illustrate emulsions of this invention are on a weight basis.

| Composition B: | Percent | Percent |
|---|---|---|
| Water phase | | 35 |
|   Ethylene glycol | 20 | |
|   Water | 80 | |
| Oil phase | | 65 |
|   N-2,3-dihydroxypropane polyisobutenyl succinimide, (polyisobutenyl MW ca. 1100) | 4 | |
|   Polyoxyethylene sorbitan monostearate (Tween 60) | 1 | |
|   Phenyl-alpha-naphthylamine | 0.1 | |
|   2,6-ditertiarybutyl-4-methylphenol | 0.5 | |
|   Zinc dithiophosphate (Santolube 393) | 1 | |
|   Mineral oil (100 SUS 100° F) | 93.4 | |
| Composition C: | | |
| Water phase | | 40 |
|   Water | 100 | |
| Oil phase | | 60 |
|   Polyisobutenyl (MW ca. 1100) succinic anhydride | 3 | |
|   Polyoxyethylene sorbitan mono-oleate (Tween 80) | 1 | |
|   2,6-ditertiarybutyl-4-methylphenol | 0.5 | |
|   Phenyl-alpha-naphthylamine | 0.1 | |
|   Polymeric methacrylate (Acryloid 150) | 0.25 | |
|   Mineral oil (100 SUS 100° F.) | 95.15 | |
| Composition D: | | |
| Water phase | | 40 |
|   Ethylene glycol | 10 | |
|   Water | 90 | |
| Oil phase | | 60 |
|   Polyisobutenyl (MW ca. 1100) succinic anhydride | 3 | |
|   Polyoxyethylene sorbitan mono-oleate (Tween 80) | 1 | |
|   2,6-ditertiarybutyl-4-methylphenol | 0.5 | |
|   Phenyl-alpha-naphthylamine | 0.1 | |
|   Polymeric methacrylate (Acryloid 150) | 0.25 | |
|   Mineral oil (100 SUS 100° F.) | 95.15 | |
| Composition E: | | |
| Water phase | | 40 |
|   Ethylene glycol | 10 | |
|   Water | 90 | |
| Oil phase | | 60 |
|   N-tris(hydroxymethyl)methyl polyisobutenyl succinimide (polyisobutenyl MW ca. 1100) | 3 | |
|   Polyoxyethylene sorbitan mono-oleate (Tween 80) | 1 | |
|   Phenyl-alpha-naphthylamine | 0.1 | |
|   2,6-ditertiarybutyl-4-methylphenol | 0.5 | |
|   Polymeric methacrylate (Acryloid 150) | 0.25 | |
|   Mineral oil (100 SUS 100° F.) | 95.15 | |
| Composition F: | | |
| Water phase | | 30 |
|   Hexylene glycol | 5 | |
|   Water | 95 | |
| Oil phase | | 70 |
|   N-tris(hydroxymethyl)methyl polyisobutenyl succinimide (polyisobutenyl MW ca. 1100) | 2.8 | |
|   Polyoxyethylene sorbitan monostearate (Tween 60) | 1.4 | |
|   Cadmium diamyl dithiocarbamate | 1 | |
|   Polymeric methacrylate (Acryloid 150) | 0.25 | |
|   Mineral oil (100 SUS 100° F.) | 94.55 | |
| Composition G: | | |
| Water phase | | 40 |
|   Water | 100 | |
| Oil phase | | 60 |
|   Tetraethylene pentamine derivative of polyisobutenyl (MW ca. 1100) succinic anhydride | 3 | |
|   Polyoxyethylene sorbitan mono-oleate (Tween 80) | 1 | |
|   2,6-ditertiarybutyl-4-methylphenol | 0.5 | |
|   Polymeric methacrylate (Acryloid 150) | 0.25 | |
|   Mineral oil (100 SUS 100° F.) | 95.15 | |
| Composition H: | | |
| Water phase | | 40 |
|   Ethylene glycol | 10 | |
|   Water | 90 | |
| Oil phase | | 60 |
|   Tetraethylene pentamine derivative of polyisobutenyl (MW ca. 1100) succinic anhydride | 3 | |
|   Polyoxyethylene sorbitan mono-oleate (Tween 80) | 1 | |
|   2,6-ditertiarybutyl-4-methylphenol | 0.5 | |
|   Phenyl-alpha-naphthylamine | 0.1 | |
|   Polymeric methacrylate (Acryloid 150) | 0.25 | |
|   Mineral oil (100 SUS 100° F.) | 95.15 | |
| Composition J: | | |
| Water phase | | 40 |
|   Water | 100 | |
| Oil phase | | 60 |
|   Polyisobutenyl (MW ca. 1100) succinic anhydride | 3 | |
|   Polyoxyethylene sorbitan mono-oleate (Tween 80) | 1 | |
|   2,6-ditertiarybutyl-4-methyl phenol | 0.5 | |
|   Phenyl-alpha-naphthylamine | 0.1 | |
|   Polymeric methacrylate (Acryloid 150) | 0.25 | |
|   Zinc dithiophosphate (Santolube 393) | 1 | |
|   Mineral oil (100 SUS 100° F.) | 94.15 | |
| Composition K: | | |
| Water phase | | 42 |
|   Water | 100 | |
| Oil phase | | 58 |
|   Polyisobutenyl (MW ca. 1100) succinic anhydride | 5 | |
|   Polyoxyethylene sorbitan monostearate (Tween 60) | 1 | |
|   Morpholine | 0.3 | |
|   Mineral oil (100 SUS 100° F.) | 93.7 | |
| Composition L: | | |
| Water phase | | 40 |
|   Water | 99.85 | |
|   NaOH | 0.15 | |
| Oil phase | | 60 |
|   Polysiobutenyl (MW ca. 1100) succinic anhydride | 3 | |
|   Polyoxyethylene sorbitan mono-oleate (Tween 80) | 1 | |
|   Mineral oil (100 SUS 100° F.) | 96 | |

The outstanding emulsion stability possessed by the compositions of this invention is shown in Table I. Water-in-oil emulsion (60% w. oil phase—40% w. aqueous phase) test fluids were prepared from a base oil of HVI 100 neutral mineral oil and, based on the weight of oil, 4% emulsifier. The emulsion stability of the test fluid at elevated temperature was determined by measuring by measuring the amount of oil separated after storage at 140° F. Emulsion stability of the test fluid under alternate freeze-thaw conditions is shown by the maximum number of FTH cycles obtained before the emulsion breaks. Each FTH cycle is 24 hours in duration and consists of 16 hours storage at 0° F. followed by 3½ hours at room temperature, 1 hour at 200° F., and 3½ hours at room temperature.

TABLE I

| Composition | 140° F. Static Storage | | Maximum FTH cycles before emulsion breaks* |
|---|---|---|---|
| | Days Storage | Percent Oil Separation | |
| I | 30 | 6 | |
| | 63 | 24 | 18 |
| II | 8 | 6 | |
| | 23 | 24 | 10 |
| III | 25 | 51 | |
| IV | 12 | 52 | 11 |
| V | 39 | 50 | 25 |
| C | 61 | 3 | >17 |
| D | 33 | 3 | >23 |
| A | 40 | 1 | 19 |
| E | 40 | 1 | >29 |
| G | 33 | 4 | >23 |
| H | 33 | 2 | >23 |
| J | 33 | 4 | >23 |
| L | 100 | 3 | |

* Emulsion breaking is defined as the appearance of 10% free water or 30% free oil.

Composition I contained, based on weight of oil, 2% basic Ca petroleum sulfonate (180% excess base), 2% basic Ca $C_{18-22}$ alkyl salicylate (200% excess base), 0.5% 2,6-ditertiarybutyl-4-methylphenol, 0.1% phenyl-alpha-naphthylamine, and 0.1% glycerol mono-oleate.

Composition II contained, based on weight of oil (2% basic Ca petroleum sulfonate (180% excess base), 2% basic Ca $C_{18-22}$ alkyl salicylate (200% excess base), 0.5% 2,6-ditertiarybutyl-4-methylphenol, 0.1% phenyl-alpha-naphthylamine, and 0.1% glycerol mono-oleate, and, based on weight of aqueous phase, 10% ethylene glycol.

Composition III contained, based on weight of oil, 4% polyisobutenyl (MW ca. 1100) succinic anhydride.

Composition IV contained, based on weight of oil, 4% N-tris(hydroxymethyl)methyl polyisobutenyl (MW ca. 1100) succinimide [reaction product of polyisobutenyl (MW ca. 1100) succinic anhydride with tris(hydroxymethyl)aminomethane].

Composition V contained, based on weight of oil, 4% reaction product of polyisobutenyl (MW ca. 1100) succinic anhydride with tetraethylene pentamine.

From the results in Table I, it can be seen that the emulsions with the succinic anhydride or imide derivatives are quite unstable and are unsuitable. An emulsion with the polyoxyalkylated ester alone is an oil-in-water emulsion which is unsuitable for use as hydraulic fluids because of lack of lubrication characteristics. Emulsions containing a combination of the succinic anhydride or imide derivatives and the polyoxyalkylated ester are highly stable and are superior in stability to the conventional type hydraulic fluid represented by Composition I. Furthermore, it is to be noted that the addition of ethylene glycol to the conventional type hydraulic fluid is detrimental to emulsion stability and is in marked contrast to the improvement in emulsion stability obtained with the present compositions.

In other experiments, various hydrocarbons were emulsified with water and emulsion stability after one week at a designated temperature was determined. The emulsion contained 3% w. polybutenyl succinic anhydride and 1% w. polyoxyethylene sorbitan mono-oleate (Tween 80), based on the oil phase. Results are as follows:

TABLE II

| Hydrocarbon | Percent Water | Emulsion Stability* | |
|---|---|---|---|
| | | 77° F. | 140° F. |
| Gasoline | 20 | 5-O | |
| Kerosene | 20 | 3-O | 13-T |
| | 40 | 3-O | 5-T |
| Furnace oil | 20 | 3-T | 8-T |
| | 40 | 3-T | 7-T |
| LVI 100 neutral | 40 | 1-T | 1-T |
| HVI 100 neutral | 40 | 1-T | 1-T |
| HVI 250 neutral | 40 | 1-O | 1-T |

*Numbers refer to percent vol. free oil and percent vol. free water, resp. (T=trace).

In another experiment, metal specimens weighing about 10 grams with a surface area of 34 square centimeters were immersed in emulsions for four weeks at a temperature of 140° F. Results are given below for Composition L, Composition L without sodium hydroxide, and a similar composition with 0.73% KOH (25% excess of the stoichiometric amount required to neutralize the anhydride present).

| Aqueous Phase | Mg. Corrosion Loss | | |
|---|---|---|---|
| | Fe | Brass | Cu |
| Distilled water | 42 | 1 | |
| Distilled water+0.15% w. NaOH (Composition L) | 2 | 0 | |
| Distilled water+0.73% KOH | 2 | 0 | 0 |

In addition to having utility as a hydraulic fluid, the water-in-oil emulsions of the present invention are also useful as glass mold lubricants. For this service, it is preferred to include about 0.01% to 2% by weight, based on the oil phase, of graphite. In general, the polyalkenyl succinimide is used for this service since polybutenyl succinic anhydride, which is acidic, tends to cause flocculation of the graphite. If desired, a portion of the required succinimide can be replaced by the anhydride. To avoid excessive acidity, generally only about 50% or less of the succinimide is replaced by the anhydride. Examples of glass mold lubricant compositions are as follows, on a weight basis:

| Composition M: | Percent | Percent |
|---|---|---|
| Water phase | | 40 |
| Water | 100 | |
| Oil phase | | 60 |
| Tetraethylene pentamine derivative of polyisobutenyl (MW ca. 1100) succinic anhydride | 3 | |
| Polyoxyethylene sorbitan mono-oleate (Tween 80) | 1 | |
| Colloidal graphite | 0.5 | |
| Low viscosity index (42 VI) mineral oil, 60 SUS 100° F | 95.5 | |
| Composition N: | | |
| Water phase | | 40 |
| Water | 100 | |
| Oil phase | | 60 |
| Tetraethylene pentamine derivative of polyisobutenyl (MW ca. 1100) succinic anhydride | 1.5 | |
| Polyisobutenyl (MW ca. 1100) succinic anhydride | 1.5 | |
| Polyoxyethylene sorbitan mono-oleate (Tween 80) | 1 | |
| Colloidal graphite | 0.5 | |
| Low viscosity index (42 VI) mineral oil, 60 SUS 100° F | 95.5 | |

Emulsion stability is demonstrated by the following results after 14 days storage at the stated temperature.

TABLE III

| | | Emulsion Stability* | |
|---|---|---|---|
| | Method of Emulsification | 77° F. | 140° F. |
| Composition M | Waring Blendor, stirring | 1-T | 7-1 |
| | | 2-T | 4-1 |
| Composition N | do | 1-T | 4-1 |
| | | 1-1 | 5-T |

*Numbers refer to percent vol. oil, and percent vol. water, respectively.

I claim as my invention:

1. A water-in-oil emulsion in which the water phase constitutes from about 20% to about 45% by weight of the emulsion and the oil phase constitutes from about 55% to 80%, the oil phase being essentially a mineral oil containing from about 1 to 10% by weight of a combination of (A) an oil-soluble compound having the formula

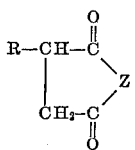

where R is a polyalkene of from about 30 to 500 carbon atoms and Z selected from the group consisting of N—H and N—X, wherein X is a radical selected from the group consisting of $(R''-N)_yR'_2$ and R''', wherein R' is a radical selected from the group consisting of hydrogen and alkyl, R'' is alkylene, $y$ is an integer of 1 to 5 and R''' is hydroxy alkyl having from 1 to 5 oxygen atoms, the number of carbon atoms in X being from 1 to 10 and (B) a polyalkoxylated partial ester of a polyhydric alcohol with monocarboxylic acid, the ratio of (A) to (B) being in the range from about 1:1 to 8:1.

2. The composition of claim 1 wherein Z is R''' and (B) is a polyalkoxylated monoester of a hexahydric alcohol with a fatty acid having from 12 to 30 carbon atoms, the number of moles of alkaline oxide reacted per mol of monoester being in the range from about 4 to 24.

3. The composition of claim 2 wherein R is polyisobutylene and R''' is tris(hydroxymethyl)amino methane.

4. Composition of claim 2 having additionally about 0.01 to 2% graphite, based on the oil phase.

5. The composition of claim 2 wherein the water phase contains from about 1 to 25% of a water soluble $C_2$–$C_6$ alkylene glycol.

6. The composition of claim 1 wherein Z is $(R''N)_yR'_2$.

7. The composition of claim 6 wherein R' is hydrogen; R'' is ethylene and $y$ is 4.

8. The composition of claim 6 wherein R' is hydrogen and $y$ is 1.

9. The composition of claim 6 having additionally about 0.01 to 2% graphite based on the oil phase.

10. The composition of claim 6 wherein the water phase contains from about 1 to about 25% of a water soluble $C_2$–$C_6$ alkylene glycol.

References Cited

UNITED STATES PATENTS

| | | | |
|---|---|---|---|
| 2,937,146 | 5/1960 | Cutlip et al. | 252—75 |
| 2,965,574 | 12/1960 | Tierney et al. | 252—75 |
| 3,131,150 | 4/1964 | Stuart et al. | 252—34.7 |
| 3,269,946 | 8/1966 | Wiese | 252—78 X |

FOREIGN PATENTS 922,831    4/1963    Great Britain.

OTHER REFERENCES

HaHon, R. E., Introduction to Hydraulic Fluids, N.Y. Reinhold, 1962, p. 274.

The Merck Index, N.Y. Merck and Co., Inc., 1952, p. 475.

LEON D. ROSDOL, *Primary Examiner.*

S. D. SCHWARTZ, *Assistant Examiner.*